Oct. 22, 1957 L. G. BOUGHNER 2,810,587
TANDEM AXLE SUSPENSION SPRING SEAT MOUNTING
Filed June 11, 1953 2 Sheets-Sheet 1
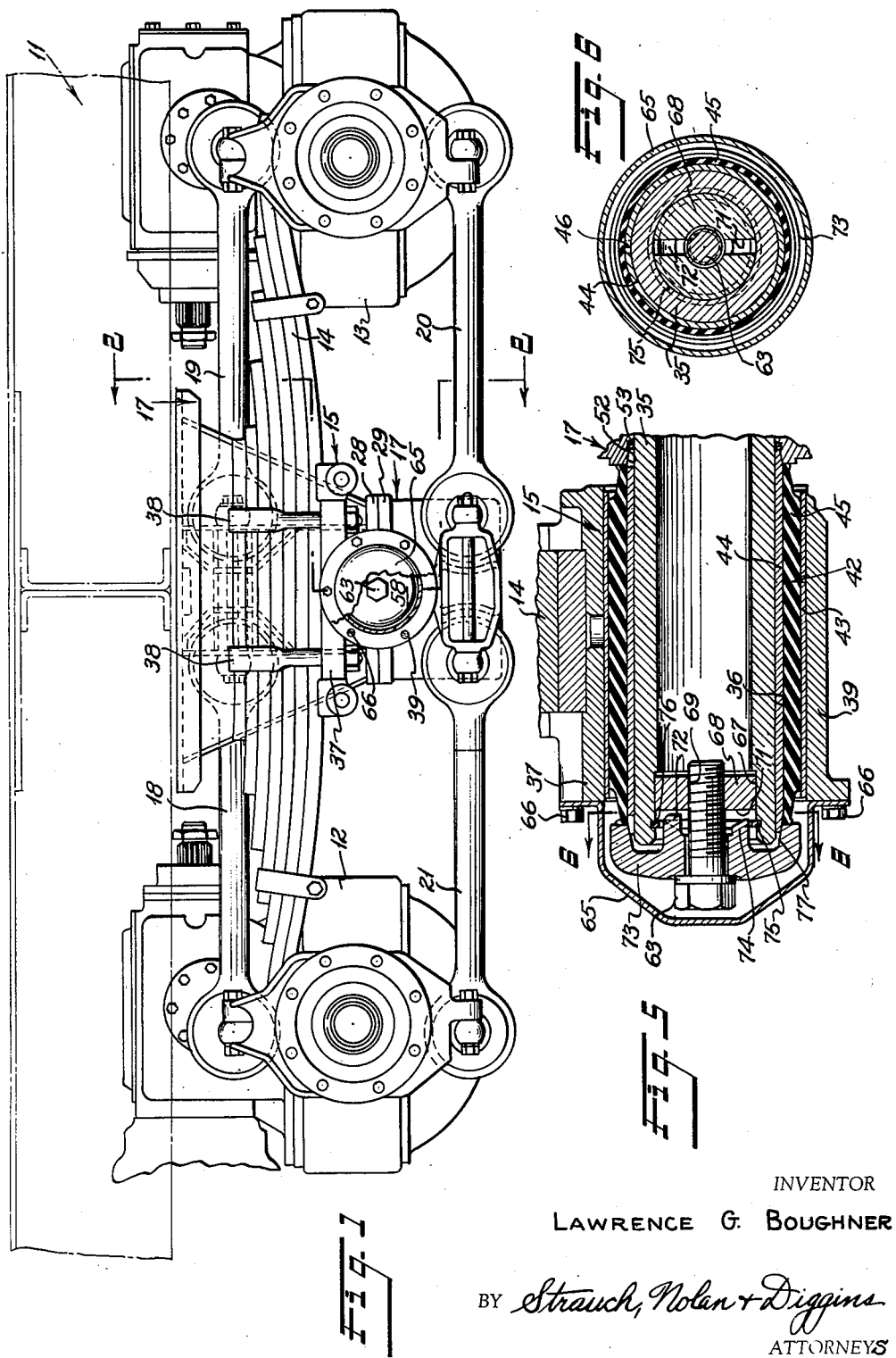
INVENTOR
LAWRENCE G. BOUGHNER
BY Strauch, Nolan + Diggins
ATTORNEYS Oct. 22, 1957 L. G. BOUGHNER 2,810,587
TANDEM AXLE SUSPENSION SPRING SEAT MOUNTING
Filed June 11, 1953 2 Sheets-Sheet 2
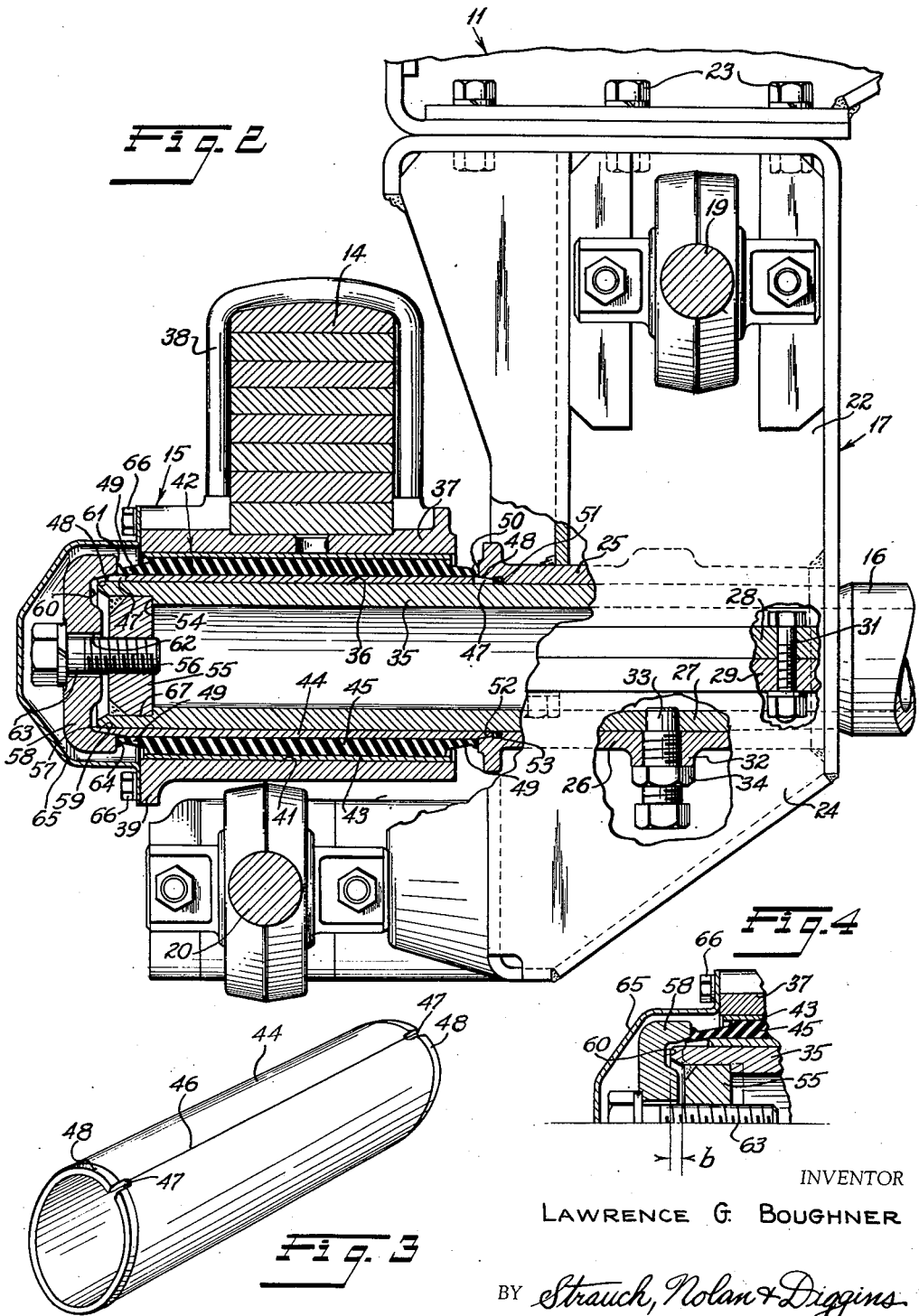
INVENTOR
LAWRENCE G. BOUGHNER
BY Strauch, Nolan & Diggins
ATTORNEYS United States Patent Office 2,810,587
Patented Oct. 22, 1957

2,810,587

TANDEM AXLE SUSPENSION SPRING SEAT MOUNTING

Lawrence G. Boughner, Detroit, Mich., assignor, by mesne assignments, to Rockwell Spring and Axle Company, Coraopolis, Pa., a corporation of Pennsylvania Application June 11, 1953, Serial No. 361,053

13 Claims. (Cl. 280—104.5)

This invention relates to spring seat mountings in tandem axle suspensions for multi-wheel vehicles and the like and is particularly directed to supporting the spring seat for oscillation on a trunnion by a special resilient bushing and associated construction.

In tandem axle vehicle bogie suspensions, the spring seat has usually been mounted for oscillation about the trunnion on bearings of a conventional nature and usually of a type designed mainly for providing bearing between relatively rotatable parts. In actual practice most of these bearings are metallic bearings, the use of sleeve bushings of bearing metal between the spring seat and the trunnion being one well known construction, and another being the provision of tapered roller bearing assemblies between the spring seat and the trunnion. The difficulty with these metal bearings, which are designed for parts which are in more or less continuous rotation rather than the relatively low amplitude oscillation which is encountered in spring seat trunnion bearings, is that such oscillation usually results in relatively high unit area pressures over only a part of the entire bearing and soon results in galling or other deformation of the bearing surfaces which becomes cumulative and eventually results in failure of the entire suspension. Also these metal bearings must be lubricated and if that is neglected they soon wear and fail.

The various difficulties encountered with spring seat trunnion metal bearings have resulted in efforts to use other type bearings which are more particularly suited to the nature of the bearing action encountered in spring seat trunnion mountings. It has been proposed for example to provide rubber sleeve bushings between the spring seat and the trunnion. Since they are direct installations, these rubber bushings of the prior art for the main part require considerable machining of spring seat and trunnion to prepare for reception of the rubber cylinder sleeve in the assembly, and as a matter of actual practice the use of these rubber bushings has been confined mainly to conversion kits which although inexpensive of themselves require considerable labor for installation of the rubber bushings in place of the conventional metal bushings already in the assembly.

However, both in initial installations and in conversion assemblies, serious operational difficulties have also been encountered with these prior rubber bushings. The chief problem which has been encountered in attempting to use such rubber bushings has been the difficulty of securing the inner and outer peripheries of the rubber sleeve against rotation on the spring seat and the trunnion to prevent undue wear and deterioration due to friction generated heat, and it has been found necessary in many of these installations to use extremely high torque fastening elements which require expensive parts of considerable mechanical strength. Further, the use of high compression rubber sleeve holding devices which have been proposed to secure the rubber sleeve on the trunnion frequently pinch the ends of the rubber sleeves and give rise to early failure.

The present invention provides a spring seat trunnion mounting which employs a resilient bushing assembly between the spring seat member and the trunnion, and the bushing assembly is of such novel character and is so mounted that the foregoing difficulties of the prior art are eliminated and avoided.

With the above in mind it is a major object of the invention to provide a tandem axle vehicle suspension wherein the spring seat is mounted for oscillation on the trunnion by a novel resilient bushing arrangement.

It is a further object of my invention to provide a novel resilient bushing assembly for use between a trunnion and a spring seat mounted for oscillation on the trunnion wherein a sleeve of rubber is maintained under radial compression between inner and outer metallic shells and the parts have such special construction and relative dimensions and are so secured that oscillation of the spring seat about the trunnion is taken up internally within the body of the rubber with no slippage between the rubber bushing and adjacent metal surfaces or between the bushing shells and adjacent metal surfaces.

It is a further object of my invention to provide a spring seat trunnion bushing construction wherein a rubber sleeve is held under radial compression between inner and outer thin metal shells and wherein the inner shell is of greater axial legth than the rubber sleeve in the assembly and is secured to the trunnion in a novel manner.

It is a further object of the invention to provide in a resiliently bushed spring seat trunnion mounting in a tandem axle suspension a special coacting bracket and bushing construction wherein the inner end of the bushing is formed to interfit with the bracket that supports the trunnion.

A further object of the invention is to provide a novel readily removable resilient bushing ararngement in a spring seat trunnion mounting.

A further object of the invention is to provide in a spring seat trunnion mounting for tandem axle vehicles and the like a novel fastening arrangement for securing a resilient bushing assembly upon a trunnion wherein a special fastening means exerts a longitudinal force which locks the inner sleeve of the bushing assembly to the bracket that supports the trunnion.

It is another object of the invention to provide a novel resilient spring seat trunnion mounting that is sealed against entry of dirt, water, and like corrosive or deteriorative material.

Further objects of the invention will presently appear as the description proceeds in connection with the appended claims and the annexed drawings wherein:

Figure 1 is a side elevation illustrating a vehicle tandem axle assembly which is generally conventional as far as this invention is concerned except for the manner of bushing the spring seat on the trunnion;

Figure 2 is a fragmentary enlarged section substantially on line 2—2 of Figure 1 illustrating the cross tube support bracket and details of the resilient bushing assembly and the manner of securing it upon the trunnion at each side of the vehicle;

Figure 3 is a generally perspective view of the inner shell of the rubber bushing showing the abutting edges and end notches;

Figure 4 is a fragmentary section illustrating compensation for different trunnion standouts;

Figure 5 is a fragmentary section illustrating a further embodiment of the invention wherein the manner of securing the inner shell of the bushing to the trunnion is different from Figure 2; and Figure 6 is a section on line 6—6 of Figure 5 illustrating details of the end clamp for the inner shell of the bushing.

Referring to Figure 1, a tandem axle bogie suspension assembly is illustrated as underlying and supporting the chassis 11 of a motor truck. This bogie comprises front and rear drive axles 12 and 13, respectively, upon the opposite ends of which are seated the ends of springs 14 that have their mid-points secured to spring seats 15 that are mounted for oscillation upon trunnions on the opposite ends of a stationary cross tube 16 which extends transversely of the vehicle substantially parallel to the axles and is non-rotatably secured within bracket assemblies 17. A series of torque rods 18, 19, 20 and 21 have their opposite ends resiliently and universally connected to the axles and the brackets 17, thereby providing a substantially parallelogram arrangement which effectively resists drive and brake torque at the axles and which aid in preserving the longitudinal spacing of the axles 12 and 13 in the suspension.

The structure of the drive axles, torque rods and springs and their general association which make up the bogie assembly are not part of the claimed invention which is concerned essentially with the manner in which each spring seat is mounted for oscillation on its trunnion and the special resilient spring seat trunnion bushing construction.

As illustrated in Figure 2, each bracket 17 comprises an upper section 22 secured to the side rail of chassis 11 as by bolts 23, and a lower section 24. Bracket sections 22 and 24 are formed with opposed semi-cylindrical portions 25 and 26 respectively providing a bore adapted to surround the slightly reduced end portion 27 of cross tube 16, and flanges 28 and 29 through which pass bolts 31 for clamping the bracket sections tightly about the cross tube. The bracket bore is preferably slightly smaller in diameter than tube portion 27 to insure this tight fit. The bracket is formed with a thickened circumferential rib 32 through which one or more studs 33 extend and are locked by nut 34 for positively non-rotatably connecting the cross tube to the bracket.

Thus, at opposite sides of the vehicle, cross tube 16 is supported by and held against rotation in brackets 17. The cross tube projects away from the chassis through each bracket 17 and the projecting portions at each side of the vehicle serve as fixed trunnions 35 each having a cylindrical outer periphery 36.

The spring seat 15 comprises a normally horizontal platform 37 to which the mid-portion of the spring 14 is secured as by U-bolts 38, and an integral boss 39 that surrounds trunnion 35 and has an internal smooth cylindrical bore 41. The spring seat is mounted for oscillation upon the trunnion by a resilient bushing assembly, generally designated at 42 and consisting of an outer thin metal shell 43, an inner thin metal shell 44 and a stretched sleeve 45 of rubber or like resilient material maintained under high radial compression between the two shells.

The inner shell consists of a sheet of thin metal rolled into circular tubular form until its opposite side edges abut as shown at 46 in Figure 3. The corners of the sheet are each cut back so that, as shown in Figure 3, notches 47 are provided at both ends of the tubular shell. The purpose of these notches is to provide for unrestricted circumferential contraction of the shell ends as shell 44 is secured to the trunnion as will appear. Furthermore the end edges of the sheet are externally beveled at 48 to provide on the shell at each end an annular continuous smooth inclined surface for a purpose to appear.

The outer shell 43 is thinner than the inner shell and a continuous metal cylinder which is appreciably shorter than inner shell 44. The rubber sleeve 45 is cylindrical and longer than shell 43 but shorter than inner shell 44. Sleeve 45 is of substantially uniform thickness between the coextensive portions of the shells 43 and 44 where it is radially compressed. At each end, substantially where it emerges from between the coextensive portions of the shells, rubber sleeve 45 is formed with decreasingly tapered thinner portions 49 that terminate substantially at the inner edges of the inclined surfaces 48 of the inner shell. These portions 49 snugly surround the inner shell but are unconfined otherwise.

The entire resilient bushing assembly is made up apart from the trunnion and spring seat, using special mandrels and other tools for axially stretching the original rubber sleeve to incorporate it between the shells and releasing it to be held under radial compression between the shells. The bond between the molded rubber sleeve and the shell surfaces in such construction is such that it is maintained against slippage under many times the torque expectedly encountered in operation of the vehicle. This particular method of assembling the unit 42 is not part of the present invention, but the special bushing construction and association with the spring seat, trunnion and other vehicle parts do constitute important features of the invention. It is also within the scope of the invention to use a bushing assembly wherein the shells are vulcanized or otherwise bonded to the rubber sleeve. When the resilient bushing assembly 42 is to be mounted in the vehicle, the outer shell 43 is preferably first tightly press fitted within bore 41 of the spring seat to mount the entire bushing 42 on the spring seat 15, then the assembled spring seat and bushing are slipped over the trunnion end, the inner diameter of shell 44 being enough larger than trunnion 35 to permit this sliding fit, and special fastening means hereinafter to be described secure inner shell 44 to the trunnion. In some spring seat constructions a split spring seat construction like that of the Van Raden patent may be used to secure the spring seat non-rotatably to shell 43.

The end of the bracket 17 facing the trunnion is provided with an annular recess 51 and an inclined annular smooth conical surface 52 surrounding trunnion surface 36. The cone angle of surface 52 is the same as or slightly greater than that of inclined surface 48 of the inner shell so that as illustrated in Figure 2 the inner end of shell 44 enters the bracket bore in the assembly. Bracket 17 also has an annular radial face 50 adapted to engage the adjacent end of rubber sleeve 45 in the assembly. A resilient O-ring 53 is disposed in recess 51 in sealing engagement with the trunnion and bracket and retained there by the end of the inner shell 44 thus preventing the entrance of dirt and water into the interior of the trunnion.

At the outer end of the trunnion, an internal annular shoulder 54 at the bottom of counterbore 67 seats a block 55 having a threaded bore 56 coaxial with the trunnion, the outer end of block 55 lying inwardly of the outer end face 57 of the trunnion. Block 55 is secured to the trunnion 35 as by welding. A cup-shaped clamping plate 58 has an internal annular inclined substantially conical surface 59 of the same angle as or slightly greater than at 48 and adapted to engage surface 48 at the outer end of shell 44, and a flat annular radial inner end face 61 adapted to engage the adjacent end of rubber sleeve 45.

Plate 58 has a central opening 62 through which freely extends the shank of a bolt 63 threaded in bore 56 and having its larger head engaging the outer side of plate 58, so that when bolt 63 is rotated in the proper direction plate 58 is displaced axially inwardly of trunnion 35 and engages shell surface 48. Plate 58 is recessed at 60 so that it does not engage the trunnion directly. Engagement of surfaces 59 and 48 imparts several force components to inner shell 44, an axial component which forces its inner end into the bracket recess and against surface 52, and radial components that crimp both ends of the shell 44 into friction tight engagement with trunnion surface 36. As indicated at 64 the ends of rubber sleeve 45 are compressed during this assembly by engagement with surfaces 50 and 61 to form opposite end seals and cushions with the bracket and the trunnion end plate whereby the interior of the trunnion is sealed against the entry of dirt and water. A cap 65 secured to spring seat 15 as by cap screws 66 encloses the outer end of the trunnion and bushing assembly, and usually a sealing gasket is provided between the cap and spring seat.

In the assembly, when bolt 63 is drawn tight, the inner end of inner shell 44 is jammed into the bracket recess and thereby crimped and clamped onto the trunnion surface at the same time that the outer end of shell 44 is similarly crimped and clamped onto the trunnion surface by the advance of plate 58. The angle of inclination at surfaces 48, 52 and 59 is chosen with regard to shell material and thickness and for simultaneous crimping of the inner shell ends. If this angle is too steep there is insufficient crimping of the shell ends, whereas if the angle is too shallow there is a possibility of clamping the outer end of the shell 44 to the trunnion before the shell has been displaced axially enough to engage the bracket surface 52. If desired, by making the angle of the surfaces 52 and 48 at the inner end of the shell 44 somewhat less than the angle of surfaces 48 and 59 at the outer end of the shell, I may insure that the inner end is completely crimped to the cross tube before the outer end is completely crimped to the cross tube. In a satisfactory nine inch long rubber bushing assembly 42 wherein the outer shell is of steel having an outer diameter of about 4⅞" and a wall thickness of about ⅛" and the inner shell is of steel having an inner diameter of about 3½" and a wall thickness of about 3/16", I employ an angle of about 18° for surfaces 48 and the notches 47 are about ⅛" wide and may be of U-shape or V-shape as desired. This also provides adequate area of surface engagement so that the shell ends may be crimped without exceeding the elastic limit of the material in compression.

During operation of the vehicle as the spring seat oscillates about the trunnion, shells 43 and 44 remain tight and non-rotatable with the spring seat and trunnion respectively and the oscillation is both cushioned and resiliently permitted by rubber sleeve 45 throughout its radially compressed length which is not subjected to any conflicting clamping forces that might undesirably react with respect to the torsional forces to produce localized high stresses and failure in the bushing. Since no portion of the rubber sleeve which undergoes torsional stress in operation is subject to localized clamping stresses I am able to exercise close control over the compression in the sleeve and thus provide a more efficient bushing.

During assembly of the parts, I find that instead of special tools such as high torque wrenches, an ordinary 500–600 pound foot torque wrench available at most garages can be used to tighten bolt 63 sufficiently to adequately crimp the inner sleeve ends into such tight frictional engagement with the trunnion as to resist a torque that is three times as great as the wind up torque of the rubber sleeve at maximum spring seat rotational travel.

As a practical matter it has been found that due to variations in tolerances of the parts and different vehicle frame widths, the amount that trunnion 35 projects out from the frame may vary in different vehicles. These variations may be taken care of readily in the invention as shown in Figure 4 by insuring that the interior of plate 58 is recessed deeply enough at 60 to clear variations in trunnion standout for at least a predetermined range indicated at b in Figure 4, and bolt 63 is made correspondingly long.

Figures 5 and 6 illustrate a further embodiment of the invention wherein the end clamping means for securing the inner shell to the trunnion is of different construction.

In this construction the outer end of the trunnion is formed with cylindrical counterbore 67 in which is axially slidably mounted a circular block or nut 68 having a central threaded bore 69. Nut 68 is formed with a diametral slot 71 for receiving a tongue 72 projecting inwardly from clamp plate 73 so that nut 68 and plate 73 are non-rotatably interconnected. Tongue 72 protrudes from a circular rib 74 on the interior of plate 73 which has its external periphery adjacent but inwardly of a snap ring 75 disposed in a groove 76 in counterbore 67. The purpose of snap ring 75 is to limit axial outward displacement of nut 68, and the purpose of rib 74 is to retain the snap ring in its groove.

Internally plate 73 is formed with substantially conical surface 77 which is the same as surface 59, and which coacts with shell 44 as in the first embodiment. When bolt 63, which passes freely through clamp plate 73, is drawn tight the clamp plate frictionally engages the bushing shell and tongue 72 prevents rotation of nut 68 relative to the clamp plate so that the entire unit may be tightened on the trunnion end.

The invention provides an improved trunnion construction which is effectively sealed against the entry of dirt, water and like foreign matter so that corrosion, deterioration and wear are minimized. The O-ring 53 seals against entry of dirt and water longitudinally along the trunnion surface, and the compressed ends of the sleeve 45 seal against entry of dirt and water at the ends of the bushing. The cap 65 extends over and seals off the clamp plate and bolt and the outer end of the bushing. This sealing arrangement increases the useful life of the assembly and it facilitates replacement and repair operations.

Another advantage of the foregoing construction of the invention is that it facilitates removal of the bushings when replacement is necessary after long usage. Usually the bushing 42 is so disposed in the assembly that notches 47 are located at the top so as to be readily accessible when the cap and clamp plate are removed. For replacing a bushing 42, first cap 65 and clamp plate 58 are removed. Then bolts 31 are removed or loosened enough to separate the bracket sections until the trunnion is free of the bracket at the inner end of the bushing. When a tool like a screw driver is inserted in notches 47 and manipulated to loosen the crimped end portions of the inner shell, the longitudinal split in the shell greatly facilitating this operation. If necessary some lubricant can be introduced along the slit to help this action and to aid in longitudinal withdrawal of the bushing and seat by a suitable puller device. The chief reason that shell 44 is split longitudinally is that such facilitates removal of the bushing from the trunnion after long usage. The notches 47 are provided primarily for aiding crimping of the shell ends and secondarily to aid in starting splitting of the shell during removal.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a tandem axle vehicle suspension, a relatively stationary trunnion, a spring seat mounted for oscillation about said trunnion, a resilient bushing interposed between the spring seat and trunnion comprising a sleeve of resilient material, an outer thin metal shell tight with said sleeve and secured to said spring seat and an inner thin metal shell tight with said sleeve and surrounding said trunnion, said sleeve of resilient material having its outer ends outwardly radially unconfined and terminating short of the ends of said inner shell, deformable end portions on said inner shell disposed axially outwardly of said resilient sleeve ends, and means disposed essentially axially outwardly of said resilient sleeve ends for substantially simultaneously radially deforming both said end portions of said inner shell to tightly grip said trunnion while leaving the resilient sleeve free of any radial or axial clamping by said deforming means that would set up localized stresses tending to modify operation of the resilient sleeve in torsion during operation.

2. In a tandem axle vehicle suspension, a relatively stationary trunnion, a spring seat mounted for oscillation about said trunnion, a resilient bushing interposed between the spring seat and trunnion comprising a relatively thick sleeve of resilient material, an outer thin metal shell axially shorter than said sleeve tightly secured to said sleeve and said spring seat and an inner thin metal shell axially longer than said sleeve surrounding said trunnion, and means securing said inner shell to said trunnion comprising beveled ends on said inner shell beyond said sleeve, means providing an inclined wall socket surrounding the inner end of said trunnion and adapted to receive the beveled inner end of said inner shell, and a clamp mounted for axial adjustment on the outer end of said trunnion having an inclined wall socket receiving the beveled outer end of said inner shell, said clamp when adjusted axially inwardly along said trunnion urging the beveled ends of the inner shell tightly into said sockets and thereby causing the beveled ends of said inner shell to be circumferentially contracted substantially at the same time and crimped tightly about said trunnion without clamping the resilient sleeve ends.

3. A resilient bushing assembly for mounting a spring seat for oscillation upon a trunnion in a tandem axle vehicle suspension comprising a radially compressed sleeve of rubber or like resilient material surrounded by an outer thin metal shell and lined by an inner thin metal shell, the outer shell being shorter than the sleeve and the inner shell being longer than said sleeve, and means providing deformable end portions on said inner shell formed with axially inclined smooth clamp surfaces beyond the ends of said sleeve, said end portions being adapted to be crimped upon the trunnion.

4. The bushing assembly defined in claim 3, wherein said opposite ends of the inner shell are longitudinally notched to permit circumferential contraction when clamped to the trunnion.

5. The bushing assembly defined in claim 3, wherein said outer shell is a seamless tube and said inner shell is a longitudinally split tube, and notches are formed in said clamp surfaces along the split therethrough.

6. In a tandem axle vehicle suspension, means providing a trunnion for the suspension, a chassis mounted bracket supporting the trunnion, a spring seat mounted for oscillation on said trunnion, a bushing comprising a sleeve of resilient material under radial compression between inner and outer metal shells interposed between the spring seat and the trunnion, said inner shell projecting axially beyond said sleeve at both ends and being there formed with deformable end portions, and means for securing said inner shell of the bushing assembly against rotation relative to the trunnion comprising a member mounted for axial adjustment on the outer end of said trunnion, and coacting means on said bracket and member effective upon inward axial adjustment of said member along the trunnion for substantially simultaneously crimping said deformable inner shell end portions upon said trunnion for clamping the opposite ends of said inner shell to the trunnion without clamping the adjacent ends of said resilient sleeve.

7. In the suspension defined in claim 6, said deformable end portions being beveled and said brackets and member being formed with coacting sockets for receiving the beveled ends of said inner shell and deforming them during said axial adjustment into tight engagement with said trunnion.

8. In a tandem axle vehicle suspension, a relatively stationary trunnion, a spring seat mounted for oscillation on said trunnion, a resilient bushing between said spring seat and said trunnion, said bushing comprising a resilient sleeve compressed between inner and outer shells secured respectively to the spring seat and trunnion respectively, a chassis mounted bracket supporting said trunnion inwardly of said bushing, an axially movable member mounted on the outer end of said trunnion, coacting means on said member and bracket for clamping said inner shell to said trunnion, and coacting substantially radial surfaces on said member and bracket abutting opposite ends of said sleeve.

9. In a tandem axle vehicle suspension, a relatively stationary trunnion, a spring seat mounted for oscillation about said trunnion, a resilient bushing interposed between the spring seat and trunnion comprising a sleeve of resilient material, an outer thin metal shell axially shorter than said sleeve tightly secured to said sleeve and said spring seat and an inner thin metal shell axially longer than said sleeve surrounding said trunnion, and means securing said inner shell to said trunnion comprising beveled ends on said inner shell beyond said sleeve, means providing an inclined wall socket surrounding the inner end of said trunnion and adapted to receive the beveled inner end of said inner shell, means providing a flat annular surface surrounding said inner socket, a clamp mounted for axial adjustment on the outer end of said trunnion having an inclined wall socket receiving the beveled outer end of said inner shell and means providing a flat annular surface on said clamp surrounding said outer socket, said clamp when adjusted axially inwardly along said trunnion urging the beveled ends of the inner shell tightly into said sockets and thereby causing the beveled ends of said inner shell to be contracted substantially at the same time and crimped tightly about said trunnion, and said surfaces abutting and axially compressing the opposite ends of said sleeve in the assembly to form seals against the entrance of foreign matter.

10. In a tandem axle vehicle suspension, a relatively stationary trunnion, a spring seat mounted for oscillation about said trunnion, a resilient bushing interposed between the spring seat and trunnion comprising a sleeve of resilient material, an outer thin metal shell axially shorter than said sleeve tightly secured to said sleeve and said spring seat and an inner thin metal shell axially longer than said sleeve surrounding said trunnion, and means securing said inner shell to said trunnion comprising beveled ends on said inner shell beyond said sleeve, means providing an inclined wall socket surrounding the inner end of said trunnion and adapted to receive the beveled inner end of said inner shell, a clamp mounted for axial adjustment on the outer end of said trunnion having an inclined wall socket receiving the beveled outer end of said inner shell, and means for adjusting said clamp axially of the trunnion comprising a bolt threaded in the trunnion end and projecting through said clamp with its operating head engaging the outer side of said clamp so as to be readily accessible externally of the suspension of said clamp when adjusted axially inwardly along said trunnion urging the beveled ends of the inner shell tightly into said sockets and thereby causing the beveled ends of said inner shell to be contracted substantially at the same time and crimped tightly about said trunnion.

11. In a tandem axle vehicle suspension, a relatively stationary frame mounted trunnion, a spring seat mounted for oscillation about said trunnion, a resilient bushing interposed between the spring seat and trunnion comprising a relatively thick sleeve of resilient material, an outer thin metal shell axially shorter than said sleeve tightly secured to said sleeve and said spring seat and an inner thin metal shell axially longer than said sleeve also tight with said sleeve and surrounding said trunnion, and means securing said inner shell to said trunnion comprising deformable ends on said inner shell located axially beyond said sleeve, means providing a stationary frame mounted socket surrounding the inner end of said trunnion and adapted to coact with the inner end of said inner shell, and a clamp member mounted for axial adjustment on the outer end of said trunnion having a similar socket for coacting with the outer end of said inner shell, said clamp member when adjusted axially inwardly with respect to said trunnion urging the ends of the inner shell into said sockets and thereby causing them to be deformably clamped tightly about said trunnion without clamping the adjacent ends of said resilient sleeve.

12. In the suspension defined in claim 11, means providing oppositely axially facing abutment surfaces on said frame and member adjacent said sockets at opposite sides of said spring seat.

13. In a tandem axle vehicle suspension, a relatively stationary trunnion, a spring seat mounted for oscillation about said trunnion, a relatively thick resilient bushing interposed between the spring seat and trunnion comprising a relatively thick sleeve of resilient material, an outer thin metal shell axially shorter than said sleeve tightly secured to said sleeve and said spring seat and an inner thin metal shell axially longer than said sleeve also tight with said sleeve and surrounding said trunnion, and means securing said inner shell to said trunnion comprising beveled ends on said inner shell axially beyond said sleeve, means providing an inclined frame mounted socket surrounding the inner end of said inner shell, and a cup-shaped clamp member mounted for axial adjustment on the outer end of said trunnion having an inclined socket for receiving the beveled outer end of said inner shell, said clamp member when adjusted axially inwardly along said trunnion urging the beveled ends of the inner shell tightly into said sockets and thereby causing the beveled ends of said inner shell to be contracted and tightly crimped about said trunnion substantially at the same time.

References Cited in the file of this patent

UNITED STATES PATENTS

| | | |
|---|---|---|
| 861,717 | Frankel | July 30, 1907 |
| 1,140,978 | Hart | May 25, 1915 |
| 1,721,278 | Nelson | July 16, 1929 |
| 1,794,782 | Lord | Mar. 3, 1931 |
| 2,048,256 | Geyer | July 21, 1936 |
| 2,096,530 | Alden | Oct. 19, 1937 |
| 2,116,254 | Welker | May 3, 1938 |
| 2,481,891 | Van Raden | Sept. 13, 1949 |